United States Patent Office 3,123,445
Patented Mar. 3, 1964

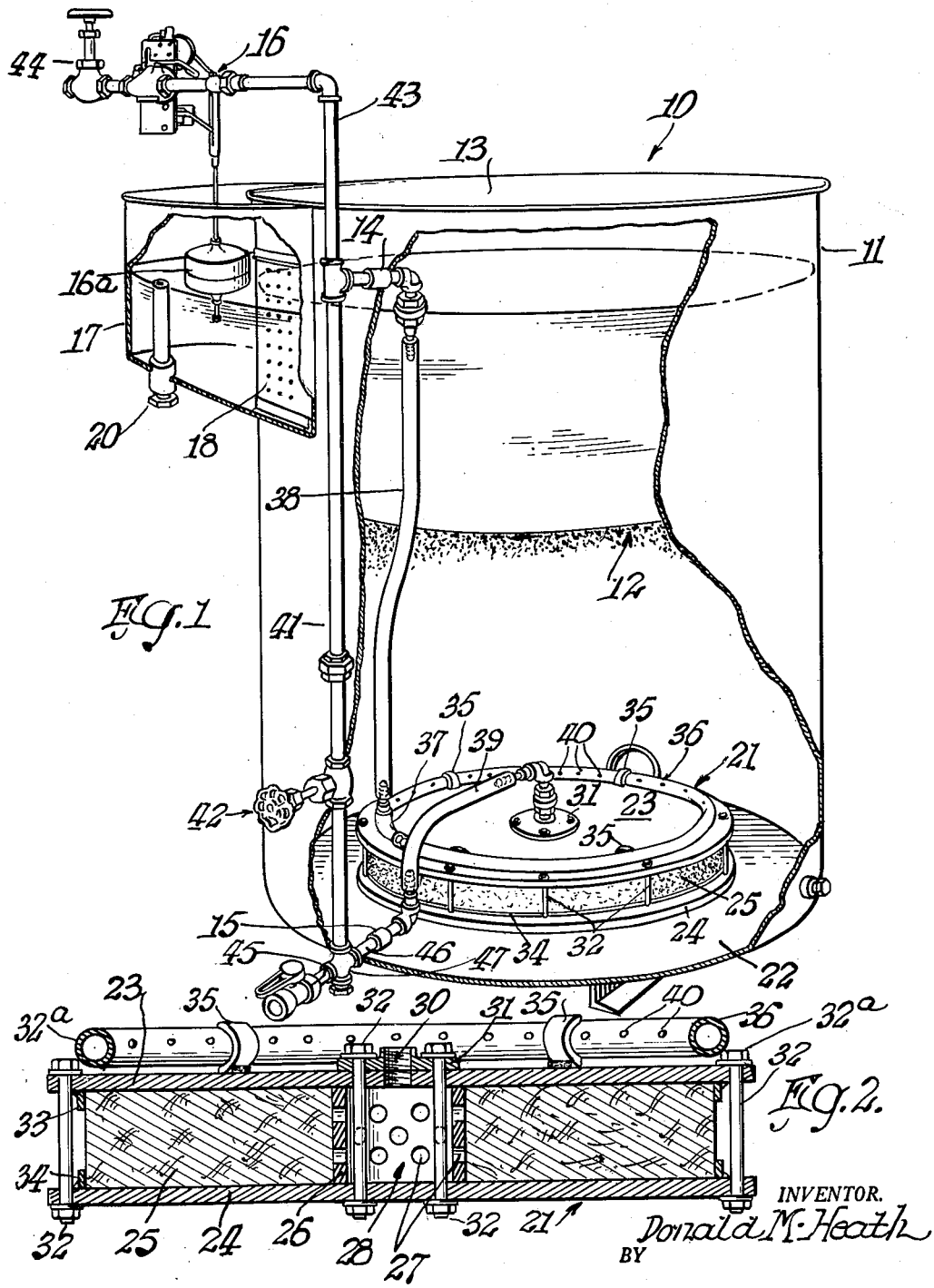

3,123,445
SOLUTION-MAKING APPARATUS
Donald M. Heath, La Grange, Ill., assignor, by mesne assignments, to Morton Salt Company, Chicago, Ill., a corporation of Delaware
Filed Dec. 5, 1960, Ser. No. 73,722
7 Claims. (Cl. 23—271)

This invention relates to a solution-making apparatus and more particularly to an apparatus adapted for use in producing brine for commercial and industrial operations.

Various apparatus of this type have heretofore been proposed which, because of certain design characteristics, are beset with numerous shortcomings. It is customary, in prior apparatus, to utilize gravel strata within the salt storage tank to support the charge of salt as well as function as a filter. With such an arrangement, however, the salt capacity of the tank is materially reduced, thereby requiring frequent recharging of the tank. In addition, the problem of properly cleaning and regrading the gravel strata oftentimes becomes a complex, awkward and time-consuming operation.

In prior apparatus, the problem of compacting of the salt within the salt storage tank is very common. One of the more serious effects resulting from the problem of compacting is that the outlet flow rate of the brine is materially reduced or, in some cases, the flow is interrupted completely.

An additional problem which is commonly associated with prior apparatus is the susceptibility of various components of the prior apparatus to corrosion by the salt or the brine itself. Due to this deleterious effect on such components, the assembly and disassembly of the prior apparatus for cleaning or maintenance becomes a most difficult task.

Another difficulty associated with prior apparatus is that many of the operating parts of the equipment are not readily accessible and, thus, servicing thereof oftentimes requires complete shutdown of the apparatus for extended periods of time.

Thus, it is one of the objects of this invention to provide a solution-making apparatus which is not beset with the aforenoted shortcomings.

It is a further object of this invention to provide a solution-making apparatus which permits the maximum utilization of the solute storage tank capacity for storage of the solute charge.

It is a still further object of this invention to provide a solution-making apparatus which permits continuous top flow rates of the solution from the apparatus.

It is a still further object of this invention to provide a solution-making apparatus which effects more efficient dissolving of the solute crystals by the liquid solvent.

It is a still further object of this invention to provide a solution-making apparatus which is capable of being readily and thoroughly cleaned so as to meet the normal sanitary requirements as imposed on equipment utilized in the production of products for human consumption.

Further and additional objects will appear from the description, accompanying drawings and appended claims.

In accordance with one embodiment of this invention, a solution-making apparatus is provided which comprises an upright solute storage tank having a liquid solvent inlet, a solute inlet, and a solution outlet. Removably disposed within the tank and positioned adjacent the bottom thereof is an assembly unit over which the solute is deposited. The unit is provided within the interior thereof with a solution-collecting cavity which is in direct communication with the solution outlet of the tank. Mounted on the outer surface of the unit is a solvent discharge element which is in direct communication with the solvent inlet for the tank. The solvent discharge element is provided with a plurality of orifices from which jets of solvent are discharged and penetrate the solute deposited on the assembly unit. The unit is provided with a foraminous portion which is exposed on one side to the interior of the tank and on the other side to the solution-collecting cavity.

For a more complete understanding of this invention, reference should be made to the drawing, wherein:

FIGURE 1 is a fragmentary perspective view of the improved apparatus having portions of the tank thereof cut away to expose the interior thereof;

FIG. 2 is an enlarged vertical sectional view of the assembly unit shown in FIG. 1.

Referring now to the drawing, an improved solution-making apparatus 10 is shown which is adapted to produce brine for use in commercial and industrial operations. While the apparatus is to be described hereinafter in relation to the production of brine, it is to be understood, of course, that the improved apparatus is not to be limited to this particular application.

The apparatus 10, in this instance, includes a large capacity upright tank 11 for the storage of the salt charge 12. The tank 11 is provided with open upper end 13 through which the salt charge is introduced into the tank interior. Adjacent the upper end of the tank 11 is a liquid solvent (water) inlet 14. Adjacent the bottom of the tank 11 is a brine outlet 15.

Upstream of the inlet 14 is a float-actuated valve 16 in which the float 16a thereof is disposed within a chamber 17 affixed to the upper outside surface of the tank 11. The chamber 17 is in communication with the interior of tank 11 through a perforated baffle plate 18. Thus, the liquid level within chamber 17 corresponds to the liquid level within the tank interior. An overflow pipe 20 is provided within chamber 17.

Removably positioned within tank 11 is an assembly unit 21 which, in this instance, rests upon the bottom surface 22 of the tank. Unit 21 includes a pair of annular-shaped imperforate top and bottom plates 23 and 24 disposed in coincident spaced relation. Sandwiched between plates 23 and 24 is a foraminous ring-like element 25, which is provided with a multitude of interconnected interstices through which the brine is caused to pass from the outer periphery of the element toward the center thereof. The element 25 may be formed of a tightly-knit mesh of polypropylene material or some other similarly porous inert plastic material. The center of element 25 is provided with an opening in which is snugly disposed a cylindrically-shaped core piece 26. The core piece 26 is provided with a plurality of perforations 27 and the piece defines a brine-collecting cavity 28. The lower end of core piece 26 is closed off by imperforate bottom plate 24. The upper end of core piece 26, in turn, is closed off by top plate 23; the latter, however, is provided with an internally threaded bore 30. The bore 30 is centrally disposed with respect to top plate 23 and functions as an outlet for cavity 28. A flanged connector 31 is mounted on the outer surface of top element 23 and in alignment with bore 30.

Plates 23 and 24 and ring-like element 25 are held in assembled relation by a plurality of symmetrically arranged clamping bolt and nut assemblies 32. Outward deformation of ring-like element 25 is restrained, upon tightening assemblies 32, by peripheral inwardly projecting flanges 33 and 34 formed on plates 23 and 24, respectively.

The upper, or exposed, surface of plate 23 is provided with a plurality of upwardly projecting brackets 35 which are symmetrically arranged about bore 30 as an axis. Brackets 35 are adapted to engage an annularly-shaped solvent discharge element 36, the latter being preferably formed of a suitable plastic tubular material which is not deleteriously affected by either the solvent or solute. The heads 32a of the bolt and nut assemblies 32 cooperate with brackets 35 to retain the element 36 in its annular configuration. To one end of eelment 36 is provided a fitting 37. The ends of fitting 37 are reduced in size and have serrated outer peripheries which permit slip-on type of connections between the end of the discharge element 36 and the fitting 37 and betwen the end of a piece of conduit 38 and the fitting 37. Conduit 38 has the upper end thereof connected to solvent inlet 14. By reason of the slip-on type of connections, various components of the apparatus may be readily assembled and disassembled when desired.

Discharge element 36 is provided with a plurality of longitudinally spaced orifices 40, which permit jets of the solvent to be directed angularly upwardly and effectively penetrate the solute deposited over the assembly unit 21. By reason of the jetting action of the solvent discharge from element 36, vigorous turbulence is created within the area surrounding assembly unit 21 and thus no compacting of the solute results. Furthermore, because of such turbulence, more efficient dissolving of the solute by the solvent takes place. The jetting solvent, subsequent to penetrating the solute, is caused to flow through foraminous element 25, core 26 and into collecting cavity 28. From the cavity 28 the solution is caused to flow past connector 31 and through a conduit 39 which interconnects connector 31 to outlet 15.

It will be noted in FIG. 1 that inlet 14 and outlet 15 are interconnected by a bypass pipe section 41. Disposed within section 41 is a hand-operated valve 42. An additional function of section 41 and valve 42 is that it permits reversal of flow of the solvent into the tank. Such reversal may be desirable during cleaning of the apparatus.

Disposed upstream of the float-actuated valve 16 and connected to the solvent in-feed line 43 is an adjustable valve 44, which is adapted to close off completely solvent input when the apparatus is shut down, or is adapted to regulate the solvent in-feed in accordance with the solution discharge. A solution discharge valve 45 is provided in the solution discharge line 46 connected to outlet 15. Valve 45 is located downstream from the connection 47 between line 46 and bypass section 41 and is normally open except when there is to be reverse flow through the apparatus. A washout orifice 49 is provided adjacent the bottom of the tank, which is normally closed off.

It will be noted that valves 16, 42 and 44 and lines 43 and 41 are located outside of the interior of tank 11 and are not exposed to the adverse effects of the solute or solution. Thus, the maintenance of these various components is greatly facilitated. Because of the location of conduits 38 and 39, asembly unit 21, and the various fittings therefor within tank 11, such elements are formed of material which is not deleteriously affected by the solvent, solute or solution.

The interior shape of the tank may be varied from that shown, but it is preferred that the outer periphery of unit 21 be spaced a substantially equal distance from the side walls of the tank and thus effect substantially uniform dissolving of the solute adjacent the unit.

The elimination of the conventional gravel strata within the tank in the improved apparatus materially expedites the cleaning of the apparatus and also improves materially the capacity of the tank for a charge of the solute. Because of the greater volume of the solute which can be accommodated within the tank, the recharging cycle time is materially improved. A more thorough cleaning of the apparatus is possible with the improved apparatus and thus the improved apparatus is capable of being used in the production of solution suitable for human consumption. Furthermore, servicing and maintenance of the improved apparatus is minimized and may be expedited, thereby reducing substantially periods of shutdown.

The agitating action of the solvent jetting from the discharge element 36 overcomes effectively the common problem of solute compacting associated with prior apparatus of this type and, thus, continuous discharge of the solution at a top flow rate is effectively obtained with the improved apparatus.

While a particular embodiment of this invention is shown above, it will be understood, of course, that the invention is not to be limited thereto, since many modifications may be made and it is contemplated, therefore, by the appended claims, to cover any such modifications as fall within the true spirit and scope of this invention.

I claim:

1. An apparatus for making a solution, comprising a solute storage tank having a liquid solvent inlet and a solution outlet, an assembly unit disposed within said tank adjacent the bottom thereof and over which the solute is deposited, said unit being removable from said tank in an assembled condition, first conduit means extending from said solvent inlet to said unit, a second conduit means extending from said unit to said solution outlet, and valve means communicating with said first conduit means for controlling the level of solvent accumulated in said tank; said unit including a housing having an impervious top element, an impervious bottom element, and a filter-like intermediate element sandwiched between said top and bottom elements; said top, bottom and intermediate elements being interconnected to one another and cooperating to form a solution-collecting cavity formed within said housing, the flow of solution into said cavity being only through said intermediate element, said second conduit means being in direct communication with said cavity, and a solvent discharge element mounted on the exterior of said housing and releasably connected to said first conduit means.

2. The apparatus recited in claim 1, wherein the solvent discharge element conforms substantially to the peripheral configuration of said top element and is mounted on the upper surface thereof.

3. An apparatus for making a solution, comprising a solute storage tank having a liquid solvent inlet and a solution outlet, an assembly unit over which the solute is deposited, disposed within said tank and resting on the bottom thereof, said unit being removable from said tank in an assembled condition, first conduit means extending from said solvent inlet to said unit, a second conduit means extending from said unit to said solution outlet, and valve means communicating with said first conduit means for controlling the level of the solvent accumulated in said tank; said unit including a housing having a solution-collecting cavity formed within the interior of said housing and in direct communication with said second conduit means, said housing being provided with a filter-like side surface portion through which only the solution is caused to flow in a substantially radial direction from the tank interior into said collecting cavity, and a solvent discharge element mounted on the exterior of said housing and spaced above said filter-like side surface portion, said discharge element being releasably connected to said first conduit means and provided with a plurality of spaced orifices for directing jets of the liquid solvent into the solute surrounding said assembly unit to effect dissolving of the same.

4. An apparatus for making a solution, comprising an upright solute storage tank having a liquid solvent inlet, a solute inlet and a solution outlet; an assembly unit disposed within said tank adjacent the bottom thereof and over which the solute is deposited, said unit being removable from said tank in an assembled condition; first conduit means extending from said solvent inlet to said unit, and a second conduit means extending from said unit to said solution outlet; said unit including a housing having a filter-like side surface spaced from the interior side surface of said tank and conforming substantially to the tank surface configuration, the interior of said housing being provided with a solution-collecting cavity formed in part by said filter-like side surface, said cavity being in direct communication with said second conduit means, and a solvent discharge element mounted on the upper exterior portion of said housing and spaced from said foraminous side surface, said element being provided with a plurality of spaced orifices, the arrangements of said orifices being such that jets of solvent are caused to penetrate the solute surrounding said unit housing and effect dissolving of said solute prior to the resulting solution passing in a substantially radial direction only through said side surface into said cavity.

5. An apparatus for making a solution, comprising a solute storage tank having a liquid solvent inlet and a solution outlet, an assembly unit disposed within said tank adjacent the bottom thereof and over which the solute is deposited, said unit being removable from said tank in an assembled condition, first conduit means extending from said solvent inlet to said unit, and a second conduit means extending from said unit to said solution outlet; said unit including a housing having substantially disc-shaped impervious top and bottom elements and a replaceable, substantially washer-shaped filter element sandwiched between said top and bottom elements, said top, bottom, and filter elements cooperating to form a solution-collecting cavity substantially centrally disposed within the interior of said housing, ingress of solution into said cavity being only through said filter element, said cavity being in releasable connection with said second conduit means, and an annular solvent discharge element mounted on the exterior of said housing top element, said discharge element being provided with a plurality of spaced substantially symmetrically arranged orifices for directing jets of liquid solvent into the solute surrounding said unit.

6. The apparatus recited in claim 4, wherein the outer peripheral surface of said housing is spaced a substantially equal distance from the interior surface of said tank.

7. In a solution-making apparatus, an assembly unit for use with a solute storage tank having a liquid solvent inlet, a solute inlet, and a solution outlet, said assembly unit, when in assembled condition, being positionable in and removable from the interior of such a tank; said unit comprising a housing for disposition within such a tank and adjacent the bottom thereof, and over which solute is adapted to be deposited, said housing including interconnected impervious top and bottom elements disposed in spaced substantially superimposed relation and a filter-like element sandwiched between and rigidly supported by said top and bottom elements, said top, bottom, and intermediate elements cooperating to form a solution-collecting cavity within the interior of said housing, ingress of solution into said cavity being only through said filter-like element; a liquid solvent discharge element mounted on and carried by the upper exterior surface of said top element; a first conduit means releasably connected to said liquid solvent discharge element and adapted to be connected to the tank inlet; and a second conduit means releasably connected to said solution-collecting cavity and adapted to be connected to the tank solution outlet.

References Cited in the file of this patent
UNITED STATES PATENTS

| 1,892,331 | Courthope et al. | Dec. 27, 1932 |
| 2,230,883 | Glass | Feb. 4, 1941 |
| 2,749,222 | Munroe | June 5, 1956 |
| 2,795,332 | Burla | June 11, 1957 |